Figures 1, 2:
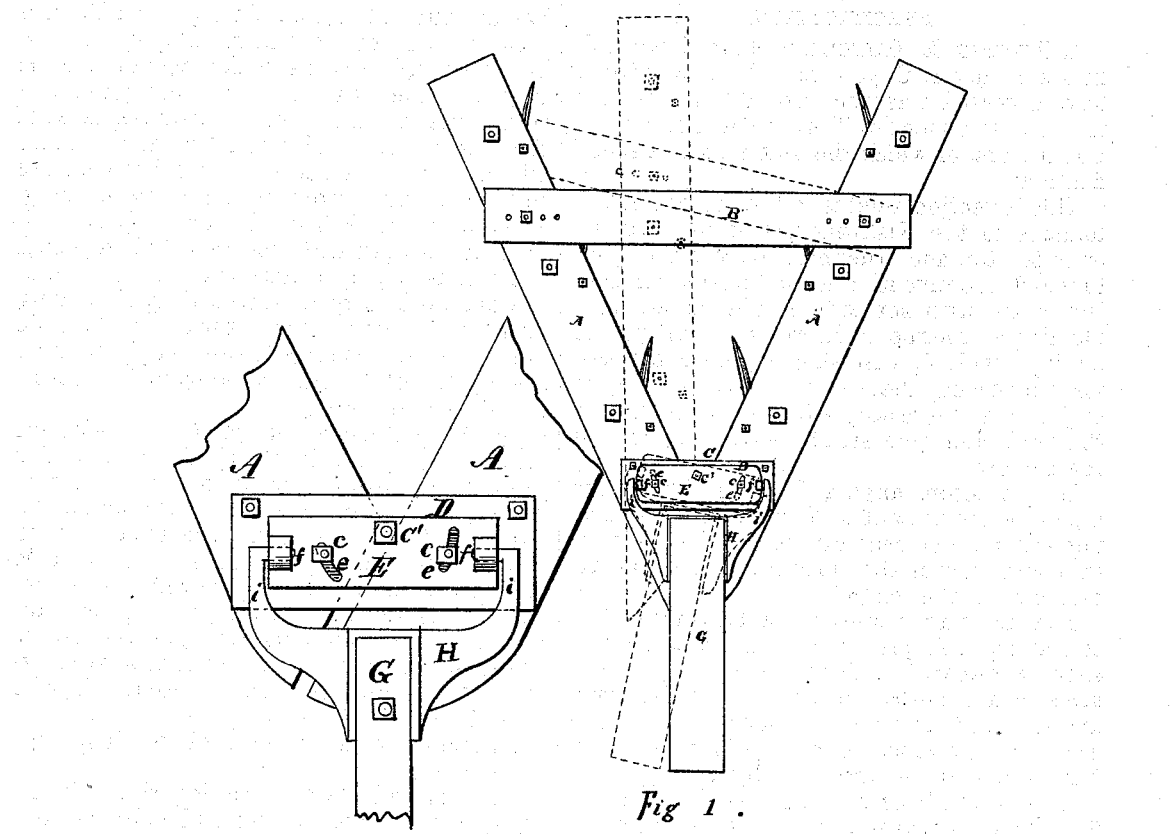

GEORGE E. HUTCHINSON.

Improvement in Cultivators.

No. 125,681. Patented April 16, 1872.

WITNESS.  INVENTOR.

UNITED STATES PATENT OFFICE.

GEORGE E. HUTCHINSON, OF CLEVELAND, OHIO.

IMPROVEMENT IN CULTIVATORS.

Specification forming part of Letters Patent No. 125,681, dated April 16, 1872.

SPECIFICATION.

I, GEORGE E. HUTCHINSON, of Cleveland, in the county of Cuyahoga and State of Ohio, have invented a new and useful Improvement in the Attachment of Tongues of Harrows or Cultivators, of which the following is a specification:

This invention relates to the attachment of tongues to the Nishwitz pulverizing harrow or cultivator, and other harrows or cultivators to which the invention is applicable. The object of the invention is to provide an adjustable hinged tongue to harrows or cultivators having revolving dish-shaped wheels or teeth for pulverizing the soil, whereby the tongue or pole may be readily adjusted to the line of the draft and give steadiness to the drag of the harrow.

In the accompanying drawing, Figure 1 is a plan or top view of a Nishwitz harrow having my improvement attached. Fig. 2 is an enlarged view of the parts relating to the attachment of the tongue.

The drawing represents a harrow having two arms, A A, pivoted at their junction to a short cross-bar, C. Near the rear end of the arms is a cross-bar, B, for holding the arms apart, and is provided with several holes near each end, by which it may be bolted, adapting the harrow to various widths.

This harrow has revolving dish-shaped teeth for pulverizing the soil, which, by their peculiar action, are liable to cause the harrow to draw irregularly and to sway from side to side as they may cut deeper on one side, or should one side meet with obstruction or heavier soil, and thus doing imperfect work.

To overcome the above-mentioned objections is the object of my improvement, which I accomplish as follows: To the short cross-bar C I attach two iron plates, D and E, each secured by bolts $c$, $c$, and $c'$. The upper plate E has curved slots $e$ $e$, which permit it to be turned on the center $c'$ for adjusting the pole to the line of draft. On the inside surfaces of the plates are a series of teeth and notches which mesh together when the bolts $c$ $c$ are tightened, which prevent the plates slipping. The upper plate E has lugs or ears $f f$ on each end, having opening in the under side to which the tongue or pole is attached. To the end of the tongue G is secured a casting, H, having projecting arms $i$ $i$, which turn in at the ends and enter the openings in the lugs $f f$, making a hinged joint for the tongue by which it may be raised and lowered.

By this method a convenient and efficient means is provided, by which this and similar kinds of harrows or cultivators may be controlled in their operations, and the tongue be readily adjusted so as to accommodate it to the line of draft, as above stated. This is rendered necessary by the peculiar construction of this harrow, which by closing for adaptation to narrower work changes the center of the line of draft, one arm of the harrow closing toward the other, as represented by the dotted lines in the drawing.

Having thus described my invention, what I claim is—

The pivoted plate E, having slots $e$ $e$ and lugs $f f$, the plate D, nuts and bolts $c$ $c$, and casting H $i$, in combination with the tongue G and harrow-frame A A B C, all substantially as herein described, for the purpose specified.

GEO. E. HUTCHINSON.

Witnesses:
 J. G. POMESENE,
 W. W. CLARK.